United States Patent [19]

Kragen et al.

[11] 4,353,805

[45] Oct. 12, 1982

[54] ENHANCED OIL RECOVERY

[75] Inventors: Horst Kragen, Carentan; Gérard Brigand, Portbail, both of France

[73] Assignee: CECA S.A., Velizy Villacoublay, France

[21] Appl. No.: 98,410

[22] Filed: Nov. 29, 1979

[30] Foreign Application Priority Data

Dec. 1, 1978 [FR] France .............................. 78 34021

[51] Int. Cl.³ .............................................. E21B 43/22
[52] U.S. Cl. ................................. 252/8.55 D; 166/246
[58] Field of Search .......... 252/8.5 C, 8.55 R, 8.55 C, 252/8.55 D; 166/246; 536/114

[56] References Cited

U.S. PATENT DOCUMENTS

| | | | |
|---|---|---|---|
| 2,175,095 | 10/1939 | Stoesser | 166/307 |
| 3,020,206 | 2/1962 | Patton et al. | 252/8.55 X |
| 3,020,207 | 2/1962 | Patton | 166/246 X |
| 3,243,000 | 3/1966 | Patton et al. | 252/8.5 X |
| 3,305,016 | 2/1967 | Lindblom et al. | 166/246 |
| 3,383,307 | 5/1968 | Goetz | 252/8.55 X |
| 3,532,166 | 10/1970 | Williams | 166/274 |
| 3,853,771 | 12/1974 | Feldmann et al. | 252/8.55 |
| 4,119,546 | 10/1978 | Wernau | 166/246 X |
| 4,265,673 | 5/1981 | Pace et al. | 252/8.55 X |

FOREIGN PATENT DOCUMENTS

2106731 5/1972 France .
2360665 3/1978 France .

OTHER PUBLICATIONS

Xanthan Gum/Keltrol/Kelzan/A Natural Polysaccharide for Scientific Water Control, Second Edition, Booklet by Kelco Company, pp. 8, 10, 19, 20, Aug. 1975.

Smith et al., Article in Journal of Petroleum Technology, Sep. 1969, pp. 1121 and 1125-1129.

*Primary Examiner*—Herbert B. Guynn
*Attorney, Agent, or Firm*—Fleit & Jacobson

[57] ABSTRACT

Application, for the enhanced oil recovery by means of an aqueous solution, of an agent capable of increasing the viscosity of the solution. Said agent consists of a mixture of a xanthan salt of a trivalent metal, iron or aluminum, with a complexant for the ion of the trivalent metal.

4 Claims, No Drawings

ENHANCED OIL RECOVERY

The present invention relates in general to petroleum production and has specific reference to a method for enhanced oil recovery by flooding a mixture of a xanthan trivalent metal salt in solution with a complexant for the trivalent ion implemented.

The oil contained in underground formations is generally under a pressure such that when, communicating freely with the surface, the oil rises naturally, without spending energy from outside. However, as the oil is recovered from the formation the pressure decreases and finally drops to a value too low for raising the oil to the surface. In some cases this pressure may have been too low from the very beginning.

When the oil fails to rise to the surface this does not mean the formation is nearly exhausted; on the contrary, only a fraction has been recovered and therefore some method must be applied for increasing the output.

The first method proposed to this end consisted in pumping the oil by using mechanical means; however, the mechanical lift or the gas-lift recovers only a limited amount of oil and involves the use of important equipment.

Consequently, other methods generally referred to as enhanced recovery have been proposed, which consist in injecting water or gas under pressure into one or a plurality of oil wells so as to substitute the corresponding fluid for the previously extracted oil and sweep the remaining oil towards the surface through one or more other wells.

However, this method did not prove fully satisfactory because oil has generally a higher viscosity than water and gas. It was found that by increasing the viscosity of the sweeping water and setting it at a level close to the oil viscosity, the oil displacement could be greatly improved and nowadays this improved secondary or tertiary enhanced recovery method is well known in oil-fields.

To increase the viscosity of water, substances of which different compositions are known, notably products known under the name of polysaccharides, are added to the water and small amounts of these substances form with water colloidal solutions the viscosity of which increases with the amount thus added. These polysaccharides are notably algae derivatives, and extracts from certain plants of the galactomannane kind. More recently, polysaccharides obtained through the growth of a micro-organism in a culture medium have been acknowledged as being particularly efficient for the purpose contemplated. This was observed notably with xanthan gum obtained through the action of a bacterium, Xanthomonas campestris, or of closely related species of the same kind.

The use of xanthan for enhanced recovery is mentioned notably in the U.S. Pat. Nos. 3,020,206 and 3,020,207. In this application xanthan appears as a particularly interesting substance but it must have a sufficient degree of purity; if it contains insoluble elements, notably cellular debris, these may plug the rock pores in the oil-bearing structure, for example sandstone.

The high-viscosity solution should flow easily and thus replace the oil in the oil-bearing structure.

The purification of xanthan for removing cellular debris therefrom is normally carried out by applying filtration, decantation or centrifugation methods. Another procedure consists in precipitating the xanthan in an insoluble form. The French Pat. No. 2,106,731 indicates the use of aluminum salts for precipitating xanthan as an efficient xanthan purification method.

Xanthan may also be precipitated by using the salts of other trivalent metals such as iron.

Under these conditions, xanthan is obtained in the form of its iron or aluminum salt. Xanthan contains inter alia residues of glucuronic acid and pyruvic acid which are neutralized partially or completely by the trivalent cations in varying amounts depending on the pH value at the precipitation time; the higher the pH, the greater the amount of trivalent cations fixed by the xanthan.

The xanthan trivalent metal salt such as aluminum or iron is an interesting utilization form due to its purity. However, this compound cannot be compared with xanthan itself. Depending upon the aluminum content, this compound either gels or is insoluble in water. Therefore, it cannot be used in an enhanced oil recovery application.

A method of determining the adaptability of a high-viscosity fluid for use under enhanced oil recovery conditions is the filtration test carried out on a filter-screen consisting of a membrane in which pores of predetermined sizes are formed. This filter-screen is known notably under the trade name MILLIPORE.

A diluted solution of xanthan iron or aluminum salt will rapidly plug a MILLIPORE filter having a pore diameter of 1.2 $\mu$m, and this proves that this solution could not be used in an enhanced oil recovery application.

The applicants found, and this is the object of the present invention, that when the iron or aluminum salt of xanthan is used in combination with a complexant of the trivalent metal cation, a non-plugging solution is obtained. The filtration test carried out on a MILLIPORE filter-screen having a pore diameter of 1.2 $\mu$m or even 0.8 $\mu$m proves that the solution filters adequately and is therefore useful for an enhanced oil recovery application.

Various iron and aluminum complexants have been used, such as ethylene-diamine tetracetate EDTA or hydroxyacid salts such as salts of citric, tartaric, lactic, acetic, oxaic, hydrofluoric or similar acids.

Preferably, alkaline citrates, earth metal, alkali metal, citrates or ammonium citrates are used, but various iron or aluminum complexants may be used for the purposes of this invention. The function of this complexant is to prevent the development of gel as a consequence of the interaction between the xanthan and the aluminum ions since it is well known that under certain conditins this mixture leads to the formation of gel.

The xanthan iron or aluminum salt is obtained by precipitating the xanthan by means of an iron or aluminum salt such as a chloride, a sulfate or a nitrate; the iron or aluminum contents of the resultant compound is subordinate to the pH value attained during the precipitation.

This content valve may vary from 0.5 to 10% by weight with aluminum, and from 1% to 20% by weight in the case of iron. Preferably, it ranges from 0.6 to 3% with aluminum and from 1.2 to 8% with iron.

On the other hand, the iron or aluminum contents may exceed the above-mentioned limits; thus, for instance, if the precipitation is accomplished in an alkaline medium, an iron hydroxide or an aluminum hydroxide precipitate, which may be relatively substantial, is carried along with the xanthan, and in this case the iron or aluminum content is high.

One may also use in lieu of iron or aluminum another trivalent metal capable of yielding similar results, but iron and aluminum are preferred not only on account of the lower cost of their salts in comparison with that of the salts of other trivalent metals, but also because they are non toxic.

As a rule, it is preferred to use an amount of complexant which is stoichiometric with respect to the amount of trivalent metal; however, a smaller amount may already improve the filterability of the product when using a 1.2 μm MILLIPORE filter-screen. If the amount of complexant is increased beyond the stoichiometric amount, the filterability is of course improved but only very moderately.

The ratio of the trivalent ion equivalent to the complexant salt acid ion ranges preferably from 10:1 to 1:10.

A clearer understanding of this invention may be obtained by reading the following examples in which the filterability test is performed as explained hereinafter:

A 0.5 percent mother-solution in water is diluted to 750 ppm in water and homogenized during 2 minutes in a plunging-type dispersion and homogeneization apparatus (for example of the POLYTRON trade mark type). Then the volume of the solution filtered during 5 mn under a 0.5 bar overpressure through a MILLIPORE filter having a diameter of 47 mm and a pore diameter of 1.2 μm is measured; the apparatus used for this last-mentioned operation being a MILLIPORE pressure filter-support.

In the following examples, the filterability is given as the volume of filtrate expressed in milliliters recovered after 5 minutes.

The viscosity expressed in centipoises (cps) is measured by using a Brookfield viscosimeter operated at 6 r.p.m. with UL adaptor. The plugging test described has also been used, this test being the closest approach to actual service conditions.

The purpose of the plugging test is to ascertain the presence of microgels in the polysaccharide solutions. These microgels pass through the pores when a pressure gradient sufficient for causing their distortion is exerted, as observed in the vicinity of the injection well, an effect adequately illustrated by the selected filterability test described hereinabove.

At a predetermined distance from the place where the product is injected into the oil-bearing formation, the pressure gradient drops considerably and the microgels can slowly occlude the formation pores.

To check this action, a polysaccharide solution is prepared and filtered under pressure first through a MILLIPORE filter having a pore diameter of 3 microns in order to remove the relatively large insoluble particles, then through another 0.8-micron MILLIPORE filter as explained hereinabove with reference to the filterability test. The filtrate is collected and allowed to rest during 24 hours, whereafter it should be capable of passing through another 3-micron MILLIPORE filter under a very low pressure (less than 100 millibars). If the cumulative throughput of the filtrate obtained after the passage through this 3-micron filter is linear in relation to a time period ranging from 24 hours to 2 weeks, it proves that the polysaccharide does not plug.

If no linear throughput is observed, this means that microgels rendering the solution unsuited for the application contemplated are present. This effect may be ascertained qualitatively by the presence of deposit on the filter surface.

In example 5 this test is used for comparing the xanthane aluminum salt in the presence of potassium citrate with an enzymated xanthan of which the filtration under pressure attained a satisfactory level, i.e. above 300.

EXAMPLE 1

Xanthan aluminum salt containing 0.89 percent aluminum, with and without sodium citrate.

|  | Viscosity cps | Filterability ml |
|---|---|---|
| Without sodium citrate | 25 | 436 |
| With 1 citrate equivalent for 1 aluminum equivalent | 28 | 600 |

EXAMPLE 2

Xanthan aluminum salt containing 3 percent aluminum, with and without various amounts of potassium citrate.

|  | Viscosity cps | Filterability ml |
|---|---|---|
| Without potassium citrate | insoluble | 15 |
| With 2 citrate equivalents for 3 aluminum equivalents | 30 | 310 |
| With 1 citrate equivalent for 1 aluminum equivalent | 28 | 674 |
| With 5 citrate equivalents for 3 aluminum equivalents | 31 | 756 |

EXAMPLE 3

The xanthan solution resulting from the fermentation is sterilized and filtered, and then precipitated by using aluminum sulfate; the precipitate is pressed until it reaches 20 percent of dry extract. Hundred kilograms of pressed precipitate, i.e. 20 kilograms of dry extract containing 400 grams of aluminum, i.e. 2%, are dried in vacuo either as such or after incorporating 4 kilograms of sodium lactate therein.

|  | Viscosity cps | Filterability ml |
|---|---|---|
| Without sodium lactate | 18 | 30 |
| With sodium lactate | 24 | 550 |

EXAMPLE 4

Xanthan iron salt containing 3.5% iron, with and without sodium tartrate.

|  | Viscosity cps | Filterability ml |
|---|---|---|
| Without sodium tartrate | insoluble | 25 |
| With sodium tartrate | 32 | 440 |

It can be seen that the use of xanthan iron or aluminum salt imparts to the solution a filterability corresponding to a good efficiency under actual enhanced recovery conditions.

EXAMPLE 5

Filtrate of a solution containing 750 ppm of xanthan aluminum salt with potassium citrate (1) corresponding to the last case of example 2, compared with that resulting from a xanthan having undergone a treatment with enzymes in order to improve its filtering properties, i.e. an enzymated xanthan (2). A preliminary filtration is conducted under pressure by using a 3-micron filter, then a 0.8-micron filter, allowing to rest during 24 hours, the product then passing through a MILLIPORE filter having a diameter of 47 mm and a pore diameter of 3 microns, under a 100-millibar overpressure.

Cumulative output in ml after:

| Solution | Time (hours) | | | | | | |
|---|---|---|---|---|---|---|---|
| | 3 | 6 | 12 | 18 | 24 | 36 | 48 |
| Xanthan aluminum salt (1) | 12 | 21 | 34 | 52 | 68 | 82 | 134 |
| Enzymated xanthan (2) | 7 | 10 | 11 | 11 | 12 | 12.5 | 13 |

It is clear that when a xanthan aluminum salt is used, the volume of the filtrate increases regularly, corresponding to a linear cumulative output, whereas with enzymated xanthan the cumulative output does not increase appreciably.

We claim:

1. In a process wherein an aqueous medium is injected into a subsurface oil-bearing reservoir through an injection well in order to displace crude oil from said reservoir, the improvement which comprises incorporating into said aqueous medium a mixture comprising a xanthan salt of trivalent iron in an amount sufficient for increasing the viscosity of said aqueous medium and a complexant for iron which is a salt of an acid selected from the group consisting of a citric acid, tartaric acid, lactic acid, acetic acid, oxalic acid, hydrofluoric acid and ethylenediamine tetracetic acid, the ratio of iron ion equivalents to the complexant salt acid ion equivalents ranging between about 10:1 and 1.10.

2. The process of claim 1 wherein the xanthan salt of iron contains from about 1 to about 20 percent by weight of iron.

3. In a process wherein an aqueous medium is injected into a subsurface oil-bearing reservoir through an injection well in order to displace crude oil from said reservoir, the improvement which comprises incorporating into said aqueous medium a mixture comprising a xanthan salt of aluminum in an amount sufficient for increasing the viscosity of said aqueous medium and a complexant for aluminum which is a salt of an acid selected from the group consisting of citric acid, tartaric acid, lactic acid, acetic acid, oxalic acid, hydrofluoric acid and ethylenedimine-tetracetic acid, the ratio of aluminum ion equivalents to the complexant salt acid ion equivalents ranging between about 10:1 and 1:10.

4. The process of claim 3 wherein the xanthan salt of aluminum contains from about 0.6 to about 3 percent by weight of aluminum.

* * * * *